US012677821B2

(12) United States Patent
Collins et al.

(10) Patent No.: US 12,677,821 B2
(45) Date of Patent: Jul. 14, 2026

(54) SYSTEM AND METHOD TO DETERMINE CONDITION OF NOZZLES OF AN AGRICULTURAL IMPLEMENT

(71) Applicant: Precision Planting LLC, Tremont, IL (US)

(72) Inventors: Sara Collins, Tremont, IL (US); Ryan Knuffman, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 219 days.

(21) Appl. No.: 18/706,448

(22) PCT Filed: Aug. 12, 2022

(86) PCT No.: PCT/IB2022/057558
§ 371 (c)(1),
(2) Date: May 1, 2024

(87) PCT Pub. No.: WO2023/111698
PCT Pub. Date: Jun. 22, 2023

(65) Prior Publication Data
US 2025/0000079 A1    Jan. 2, 2025

Related U.S. Application Data

(60) Provisional application No. 63/265,508, filed on Dec. 16, 2021.

(51) Int. Cl.
*G06T 7/00*    (2017.01)
*A01M 7/00*    (2006.01)

(52) U.S. Cl.
CPC ......... *A01M 7/0096* (2013.01); *G06T 7/0002* (2013.01); *G06T 7/97* (2017.01); *G06T 2207/30252* (2013.01)

(58) Field of Classification Search
CPC ...... A01M 7/0096; G06T 7/0002; G06T 7/97; G06T 2207/30252
See application file for complete search history.

(56) References Cited

U.S. PATENT DOCUMENTS

| | | | |
|---|---|---|---|
| 8,078,367 B2 | 12/2011 | Sauder et al. | |
| 11,219,912 B2 * | 1/2022 | Bharatiya | ............... G01S 13/04 |
| 11,738,362 B2 * | 8/2023 | Stanhope | ............. A01C 23/047 239/11 |
| 12,369,575 B2 * | 7/2025 | Maurer | ................. B05B 12/008 |
| 12,543,633 B2 * | 2/2026 | Stoller | ................. A01C 23/047 |
| 2009/0322822 A1 * | 12/2009 | Kneezel | ............... B41J 2/04588 347/17 |

(Continued)

OTHER PUBLICATIONS

European Patent Office, International Search Report related to International Patent Application No. PCT/ IB2022/057558, mail date Nov. 11, 2022, 10 pages.

*Primary Examiner* — Aaron W Carter

(57) ABSTRACT

In an aspect of the disclosure there is provided a system including nozzles disposed along an implement, a camera disposed on the implement to capture images of a spray from a nozzle of the nozzles over a time period and a processor to assign a rating to the images to account for the nozzle intermittently being off and not counting the nozzle as plugged. The processor to determine a running average for a condition of the nozzle using the assigned rating for the images.

15 Claims, 11 Drawing Sheets

(56)                    References Cited

U.S. PATENT DOCUMENTS

| | | | |
|---|---|---|---|
| 2013/0101153 A1* | 4/2013 | Kohashi .................. | G01B 7/32 |
| | | | 382/100 |
| 2015/0002677 A1* | 1/2015 | Peret .................. | A61M 5/1689 |
| | | | 348/160 |
| 2019/0358660 A1 | 11/2019 | Paralikar et al. | |
| 2019/0358661 A1* | 11/2019 | Bharatiya .......... | A01M 7/0096 |
| 2020/0037519 A1 | 2/2020 | Wonderlich et al. | |
| 2021/0178752 A1* | 6/2021 | Johnson ................ | B41J 2/0451 |
| 2021/0308708 A1 | 10/2021 | Stanhope | |
| 2021/0325868 A1 | 10/2021 | Allgaier et al. | |
| 2022/0117151 A1* | 4/2022 | Lamprecht ............ | A01M 7/005 |
| 2022/0151216 A1 | 5/2022 | Stuber et al. | |
| 2022/0153417 A1 | 5/2022 | Faers et al. | |
| 2022/0202003 A1* | 6/2022 | Schmitz .............. | A01M 7/0089 |
| 2022/0379599 A1* | 12/2022 | Nakano ................ | B41J 2/2139 |
| 2023/0015683 A1* | 1/2023 | Miyata ...................... | G06T 7/60 |
| 2023/0112376 A1* | 4/2023 | Strnad ................ | G06V 20/188 |
| | | | 47/1.7 |
| 2023/0131770 A1* | 4/2023 | Stoller ................ | A01C 23/047 |
| | | | 239/159 |
| 2023/0255128 A1* | 8/2023 | Wildermuth ......... | A01B 69/001 |
| | | | 172/430 |
| 2024/0278577 A1* | 8/2024 | Nakajima ........... | B41J 2/16579 |
| 2025/0000079 A1* | 1/2025 | Collins ............... | A01M 7/0096 |
| 2025/0146854 A1* | 5/2025 | Takeda .................. | G01F 1/667 |

* cited by examiner

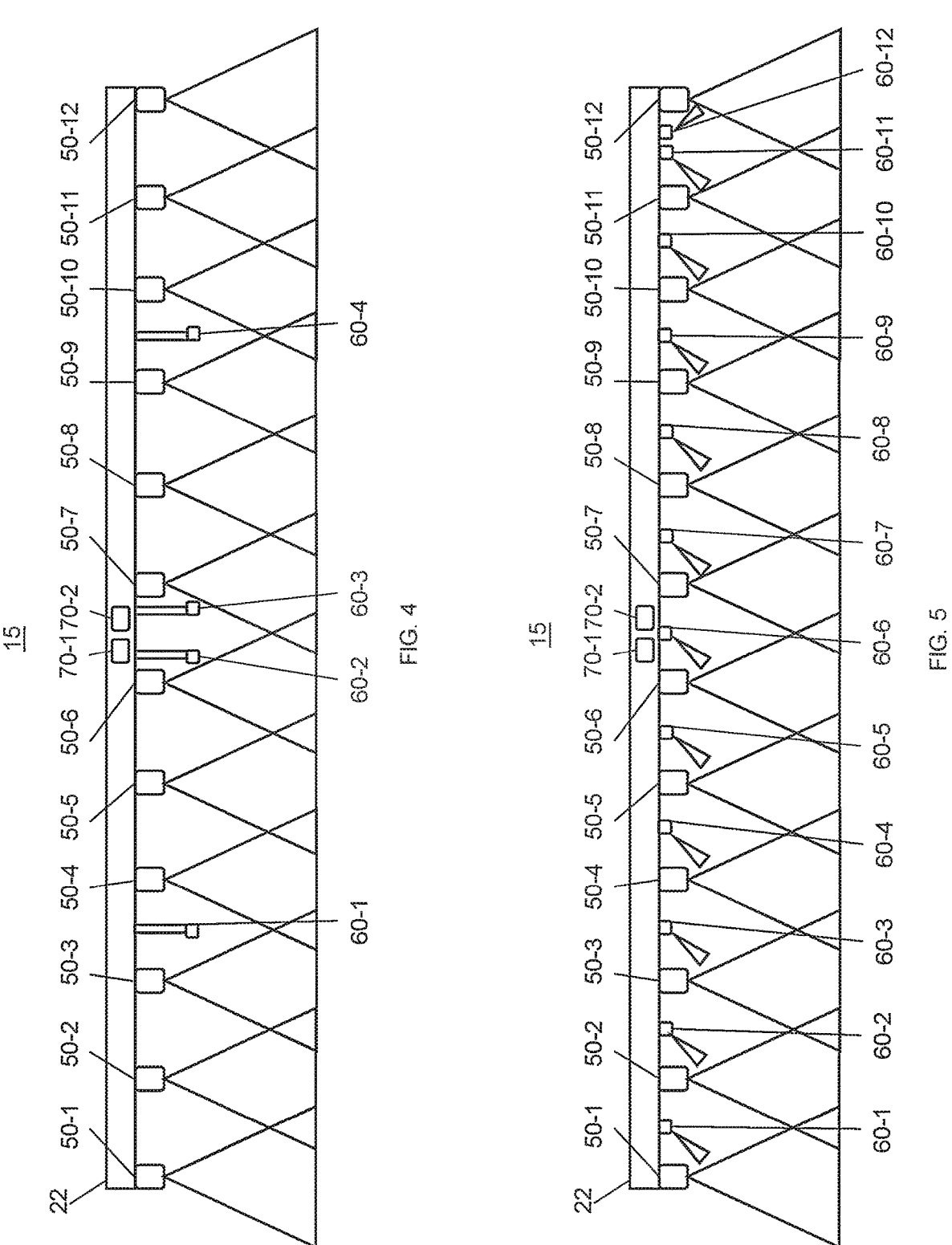

SYSTEM AND METHOD TO DETERMINE CONDITION OF NOZZLES OF AN AGRICULTURAL IMPLEMENT

CROSS-REFERENCE TO RELATED APPLICATION

This application is a national phase entry under 35 U.S.C. § 371 of International Patent Application PCT/IB2022/057558 filed Aug. 12, 2022, designating the United States of America and published in English as International Patent Publication WO 2023/111698 A1 on Jun. 22, 2023, which claims priority to U.S. Application No. 63/265,508, filed 16 Dec. 2021, all of which are incorporated herein by reference in its entirety.

FIELD

Embodiments of the present disclosure relate generally to a system and method to determine a condition of nozzles of an agricultural implement.

BACKGROUND

Sprayers and other fluid application systems are used to apply fluids (such as fertilizer, herbicide, insecticide, and/or fungicide) to fields. The sprayers and other fluid application systems operating in agricultural fields to apply fluids can become plugged and this prevents the proper application of the fluids to the agricultural fields.

BRIEF SUMMARY

In an aspect of the disclosure there is provided a system comprising a plurality of nozzles disposed along an implement; a camera disposed on the implement to capture a plurality of images of a spray from a nozzle of the plurality of nozzles over a time period; and a processor to assign a rating to the plurality of images to account for the nozzle intermittently being off and not counting the nozzle as plugged and to determine a running average for a condition of the nozzle using the assigned rating for the plurality of images. This aspect provides dynamic in real time monitoring and determination of a condition of nozzle to ensure proper nozzle performance and proper fluid delivery to an agricultural field.

In one example of this system, the nozzle is actuated with a pulse width modulation (PWM) actuator to open and close the nozzle. In another example of this system, a number of images captured for the running average is determined based on a time period of at least one cycle of the PWM nozzle.

In another example of this system, the camera captures images at a frequency that is more than twice of a PWM frequency of the PWM nozzle to avoid aliasing.

In another example, the processor to compare the running average of the condition of the nozzle to a predetermined fluid flow threshold indicator to indicate whether the nozzle has proper flow, low flow due to partial blockage, or no flow due to full blockage.

In another example, the processor to determine that the nozzle has proper flow when the running average of the condition of the nozzle is equal to or greater than the fluid flow threshold indicator and determine that the nozzle has low flow when the running average is less than the threshold indicator.

In another example, the processor to determine a frequency of the pulse width modulation (PWM) of the nozzle is 10 to 35 Hz.

A further aspect of the disclosure provides a computer-implemented method, comprising capturing, with a camera, a plurality of images of one or more spray patterns from a nozzle of an agricultural implement, assigning a rating to each captured image to account for the nozzle intermittently being off and not counting the nozzle as plugged, and determining a running average for a condition of the nozzle using the assigned rating for the plurality of images. This further aspect provides a method to dynamically in real time monitor and determine a condition of a nozzle to ensure proper nozzle performance and proper fluid delivery to an agricultural field.

In another example of this computer-implemented method, the nozzle comprises a pulse width modulation (PWM) nozzle.

In another example of this computer-implemented method, a number of images captured for the running average is determined based on a time period of at least one cycle of the PWM nozzle.

In another example of this computer-implemented method, the camera captures images at a frequency that is more than twice of a PWM frequency of the PWM nozzle to avoid aliasing.

In another example, this computer-implemented method, further comprises comparing the running average of the condition of the nozzle to a predetermined fluid flow threshold indicator to indicate whether the nozzle has proper flow, low flow due to partial blockage, or no flow due to full blockage.

In another example, this computer-implemented method further comprises determining that the nozzle has proper flow when the running average of the condition of the nozzle is equal to or greater than the fluid flow threshold indicator and determining that the nozzle has low flow when the running average is less than the threshold indicator.

In another example, this computer-implemented method further comprises displaying, with a display device, an amount of plugging if any for the nozzle.

In another example, the plugging if any is displayed as a numerical amount, a color, or a combination of a color and numerical amount.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the disclosure will now be described, by way of example only, with reference to the accompanying drawings, in which:

FIG. 4 is a rear elevation view of a spray boom with cameras and lights according to one embodiment;

FIG. 5 is a rear elevation view of a spray boom with cameras and lights according to one embodiment:

DETAILED DESCRIPTION

All references cited herein are incorporated herein in their entireties. If there is a conflict between a definition herein and in an incorporated reference, the definition herein shall control.

Figure 1:
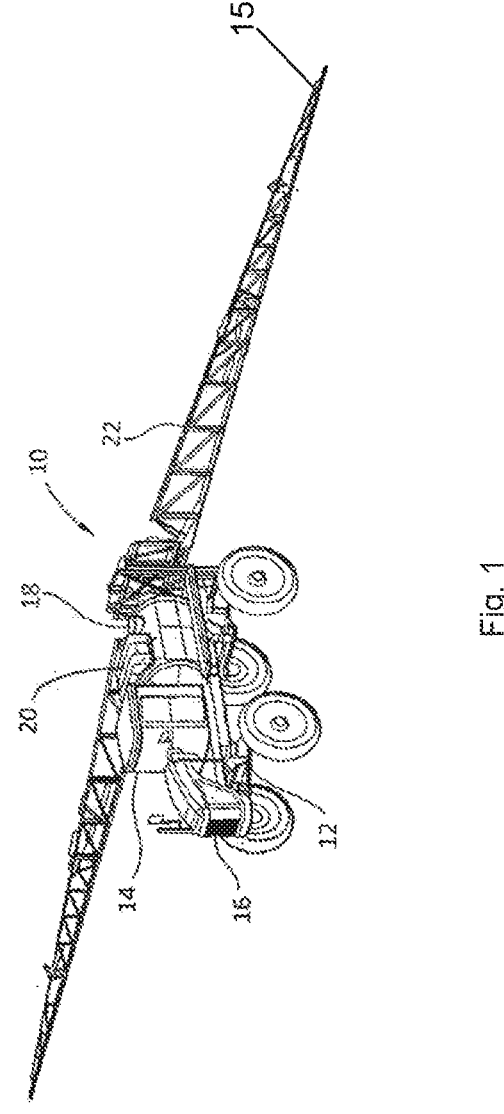
FIG. 1 is an illustration of an agricultural crop sprayer.

Referring to the drawings, wherein like reference numerals designate identical or corresponding parts throughout the several views, FIG. 1 illustrates an agricultural implement, such as a sprayer 10. While the system 15 can be used on a sprayer, the system 15 can be used on any agricultural implement that is used to apply fluid to soil, such as a side-dress bar, a planter, a seeder, an irrigator, a center pivot irrigator, a tillage implement, a tractor, a cart, or a robot. A reference to boom or boom arm herein includes corresponding structures, such as a toolbar, in other agricultural implements.

FIG. 1 shows an agricultural crop sprayer 10 used to deliver chemicals to agricultural crops in a field. Agricultural sprayer 10 comprises a chassis 12 and a cab 14 mounted on the chassis 12. Cab 14 may house an operator and a number of controls for the agricultural sprayer 10. An engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides energy to propel the agricultural sprayer 10 and also can be used to provide energy used to spray fluids from the sprayer 10.

Although a self-propelled application machine is shown and described hereinafter, it should be understood that the embodied invention is applicable to other agricultural sprayers including pull-type or towed sprayers and mounted sprayers, e.g. mounted on a 3-point linkage of an agricultural tractor.

The sprayer 10 further comprises a liquid storage tank 18 used to store a spray liquid to be sprayed on the field. The spray liquid can include chemicals, such as but not limited to, herbicides, pesticides, and/or fertilizers. Liquid storage tank 18 is to be mounted on chassis 12, either in front of or behind cab 14. The crop sprayer 10 can include more than one storage tank 18 to store different chemicals to be sprayed on the field. The stored chemicals may be dispersed by the sprayer 10 one at a time or different chemicals may be mixed and dispersed together in a variety of mixtures. The sprayer 10 further comprises a rinse water tank 20 used to store clean water, which can be used for storing a volume of clean water for use to rinse the plumbing and main tank 18 after a spraying operation.

At least one boom arm 22 on the sprayer 10 is used to distribute the fluid from the liquid tank 18 over a wide swath as the sprayer 10 is driven through the field. The boom arm 22 is provided as part of a spray applicator system 15 as illustrated in FIGS. 1-10, which further comprises an array of spray nozzles (in addition to lights, cameras, and processors described later) arranged along the length of the boom arm 22 and suitable sprayer plumbing used to connect the liquid storage tank 18 with the spray nozzles. The sprayer plumbing will be understood to comprise any suitable tubing or piping arranged for fluid communication on the sprayer 10. Boom arm 22 can be in sections to permit folding of the boom arm for transport. As illustrated in some figures, there is a left boom portion 22-1, a center boom portion 22-2, and a right boom portion 22-3.

Additional components that can be included, such as control modules or lights, are disclosed in PCT Publication No. WO2020/178663 and U.S. Application No. 63/050,314, filed 10 Jul. 2020, respectively.

Illustrated in FIGS. 2 to 9, there are a plurality of nozzles 50 (50-1 to 50-12) disposed on boom arm 22. While illustrated with 12 nozzles 50, there can be any number of nozzles 50 disposed on boom arm 22. Nozzles 50 dispense material (such as fertilizer, herbicide, or pesticide) in a spray. In any of the embodiments, nozzles 50 can be actuated with a pulse width modulation (PWM) actuator to turn the nozzles 50 on and off by opening or closing the nozzles. In one example, the PWM actuator drives to a specified position (e.g., full open position, full closed position) according to a pulse duration, which is a length of the signal.

Figures 10, 11, 12:
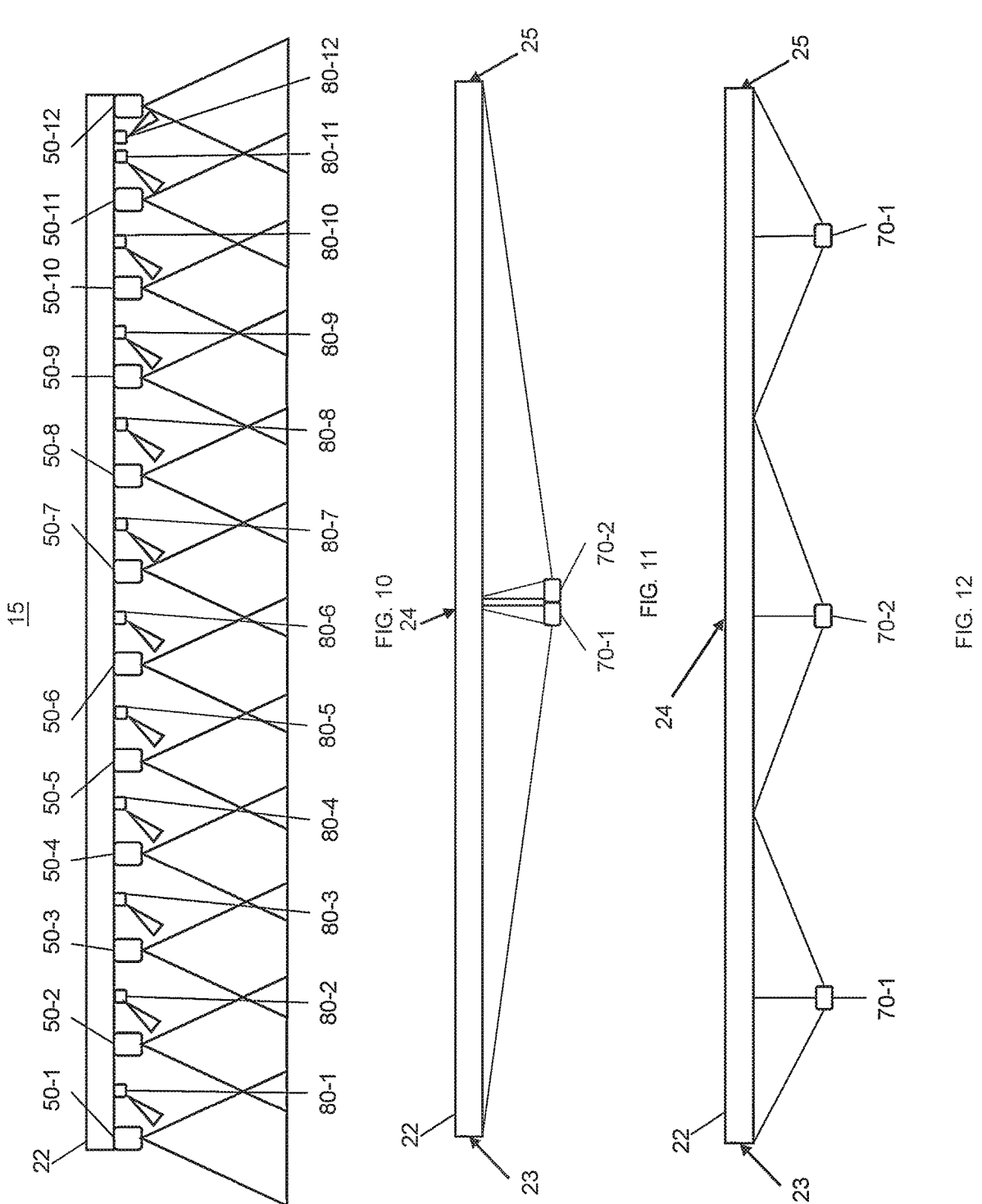
FIG. 10 is a rear elevation view of a spray boom with a combined camera and light according to one embodiment.
FIG. 11 is a top plan view of a spray boom with cameras as in FIGS. 2 to 5.
FIG. 12 is a top plan view of a spray boom with cameras as in FIGS. 6 to 9.

Illustrated in FIGS. 2 to 5, there are two cameras 70 (70-1 and 70-2) disposed on the boom arm 22 with each camera 70-1 and 70-2 disposed to view half of the boom arm 22 as seen in FIG. 11. Illustrated in FIGS. 6 to 9, there are a plurality of cameras 70 (70-1, 70-2, 70-3) each disposed on the boom arm 22 with each viewing a subsection of boom arm 22 as seen in FIG. 12. While illustrated with three cameras 70, there can be additional cameras 70. In the plurality of camera 70 embodiments, the cameras 70 can each be disposed to view an equal number of nozzles 50 or any number of nozzles 50.

Figures 2, 3:
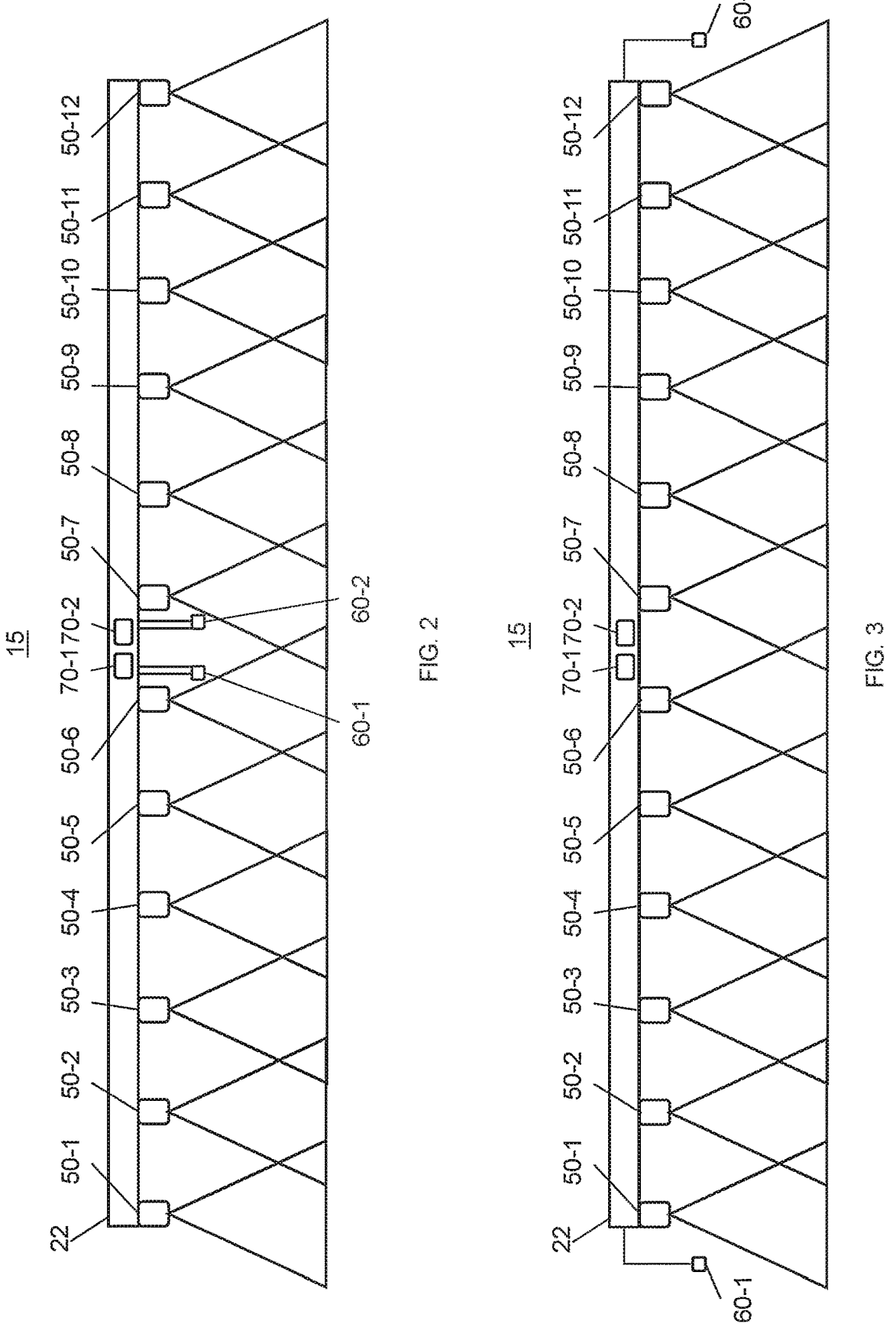
FIG. 2 is a rear elevation view of a spray boom with cameras and lights according to one embodiment.
FIG. 3 is a rear elevation view of a spray boom with cameras and lights according to one embodiment.
Figures 6, 7:
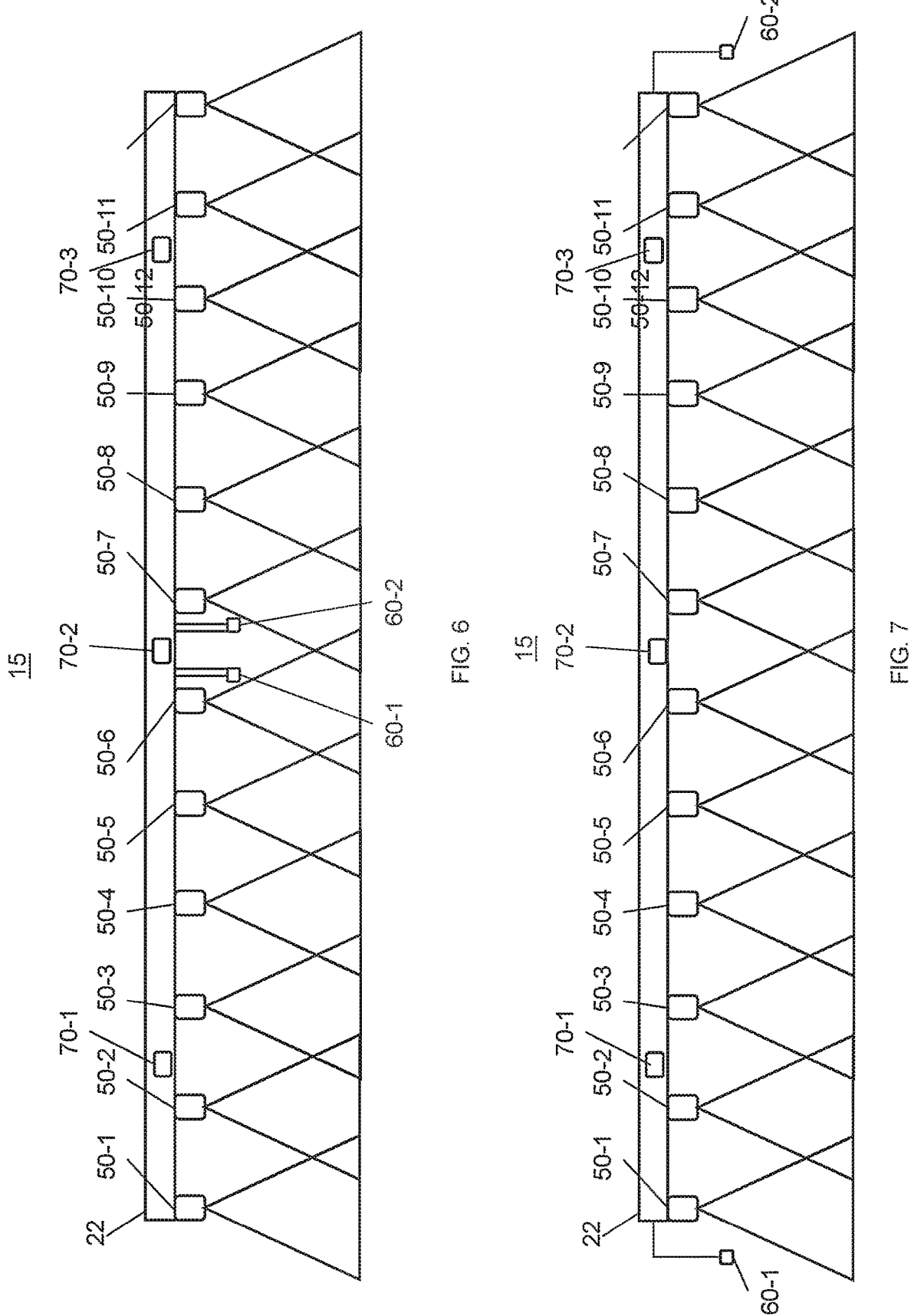
FIG. 6 is a rear elevation view of a spray boom with cameras and lights according to one embodiment.
FIG. 7 is a rear elevation view of a spray boom with cameras and lights according to one embodiment.

FIGS. 2 and 6 illustrate two lights 60 (60-1, 60-2) that are disposed at a middle (24) of the boom arm 22 and disposed to each illuminate towards ends (23, 25) of boom arm 22.

FIGS. 3 and 7 illustrate two lights 60 (60-1, 60-2) that are disposed at the ends (23, 25) of boom arm 22 and disposed to illuminate towards the middle (24) of boom arm 22.

Figures 8, 9:
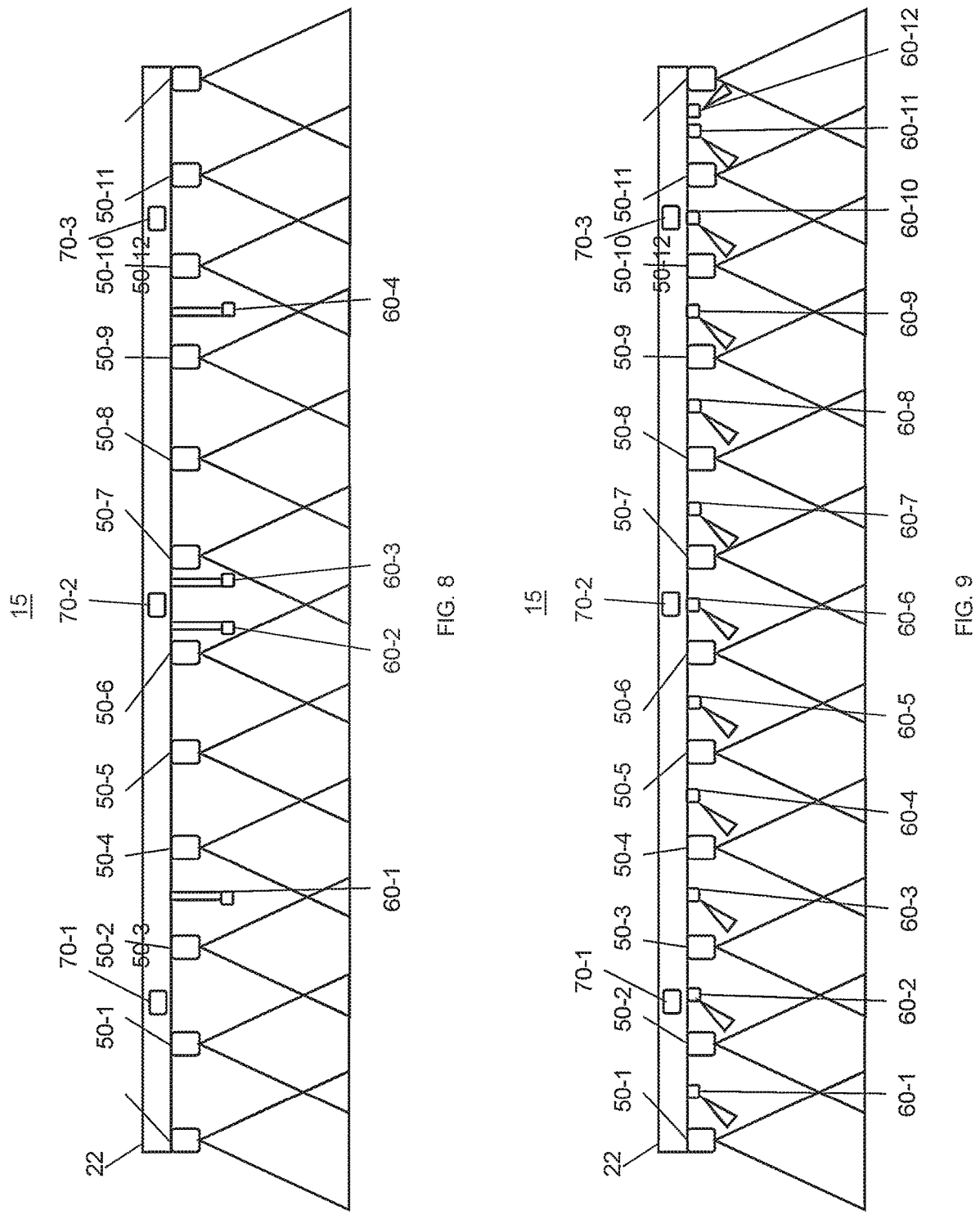
FIG. 8 is a rear elevation view of a spray boom with cameras and lights according to one embodiment.
FIG. 9 is a rear elevation view of a spray boom with cameras and lights according to one embodiment.

FIGS. 4 and 8 illustrate a plurality of lights 60 (60-1, 60-2, 60-3, 60-4) that are disposed on boom arm 22 to illuminate a subset of nozzle sprays from nozzles 50. While illustrated with each light 60 illuminating three nozzles 50, the number of nozzles 50 illuminated can range from two to less than less than all nozzles 50.

FIGS. 5 and 9 illustrate a plurality of lights 60 (60-1 to 60-12) that are each disposed to illuminate one nozzle 50.

FIG. 10 illustrates a combined camera 70 and light 60 unit 80 (80-1- to 80-12). A reference to camera 70 is to either camera 70 or camera/light unit 80 unless otherwise specifically stated.

Camera 70 can be any type of camera. Examples of cameras include, but are not limited to, digital camera, line scan camera, monochrome, RGB (red, green blue), NIR (near infrared), SWIR (short wave infrared), MWIR (medium wave infrared), LWIR (long wave infrared), optical sensor (including receiver or transmitter/receiver), reflectance sensor, laser.

In any of the embodiments, camera 70 can be coordinated with the PWM of the nozzles 50. In one embodiment, camera 70 can capture images when the nozzle 50 is off and when nozzle 50 is on. The off image can be subtracted from the on image to eliminate background light from the image. While any wavelength of the electromagnetic spectrum can be used, in one embodiment, lights 60 can illuminate with blue light. In one embodiment, the wavelength of light from light 60 is in a range of 380-500 nm or 450 to 485 nm. In one embodiment, the frequency of PWM is 10 to 35 Hz.

In one embodiment, the camera 70 operates to capture images at a minimum frequency of more than twice of a frequency of the nozzle 50 to avoid aliasing, which is an undesired effect when a sampling frequency is too low to accurately reproduce an original content, resulting in signal distortion. An image capture frequency of the camera can be twice +1 of the nozzle frequency. In one example, if the nozzles operate at 10 Hz, then the camera captures images at any frequency greater than 20 Hz. In another example, if the nozzles operate at 15 Hz, then the camera captures images at any frequency greater than 30 Hz.

In any of the embodiments, the angle of light from light 60 is not directly aligned with a camera 70.

In one embodiment, nozzles 50, lights 60, and cameras 70 are connected to a network. An example of a network is described in PCT Publication No. WO2020/039295A1 and is illustrated as implement network 150 in FIG. 17 and FIG. 18.

Figure 14:
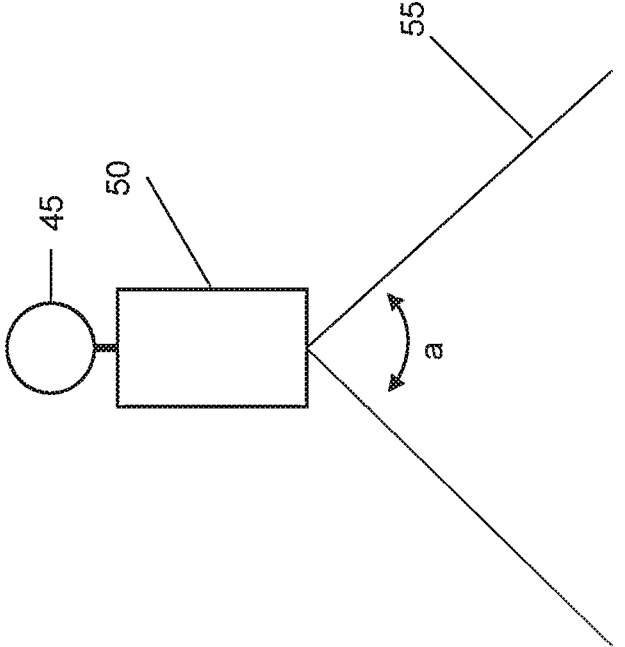
FIG. 14 is side elevation views of a spray pattern from a nozzle.
Figure 13:
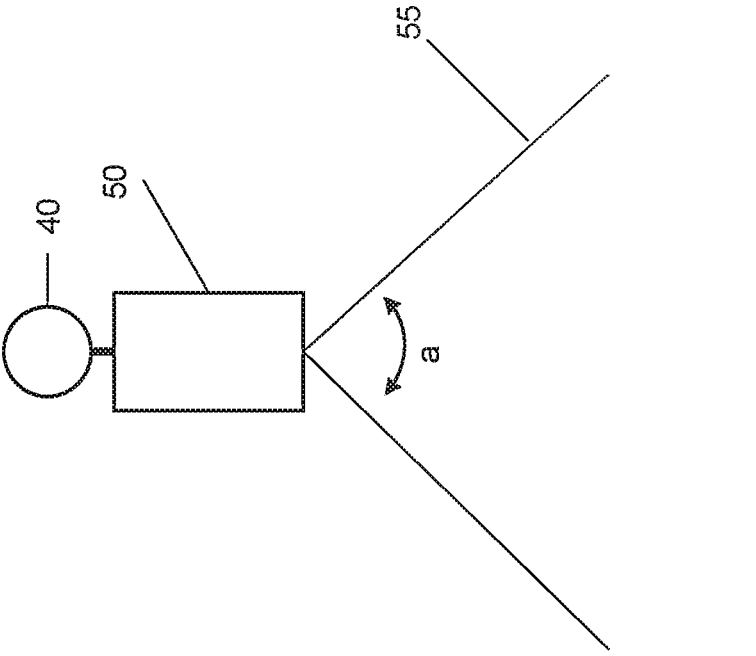
FIG. 13 is side elevation views of a spray pattern from a nozzle.

FIGS. 13 and 14 illustrate a spray pattern 55 from nozzle 50 having a spray angle (a). Spray pattern 55 can be captured in an image from camera 70. The image can be analyzed (e.g., analyzed with artificial intelligence) to determine pattern, uniformity, spray angle (a), and amount of light refracted. In FIG. 13, optional pressure sensor 40 can be installed anywhere before nozzle 50. In FIG. 14, optional flow meter 45 can be installed anywhere between nozzle 50 and the fluid source.

Spray angle (a) is a function of nozzle tip geometry, material viscosity, PWM duty cycle, pressure, and flow rate. For a given nozzle spraying a material under a specific duty cycle, these parameters are fixed. Any variation in spray angle (a) is related to changes in pressure or flow rate with one of these being fixed.

Figure 15:
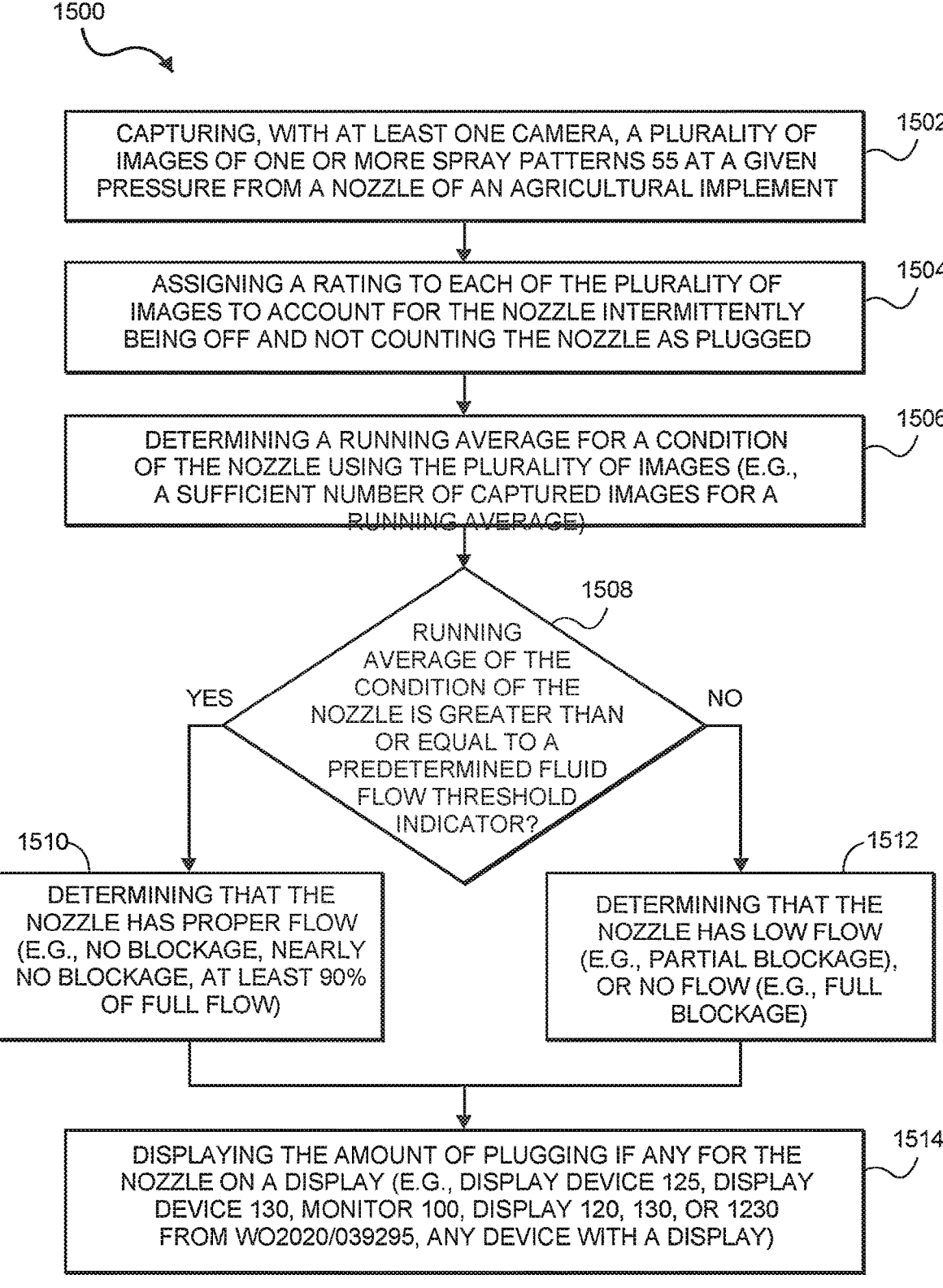
FIG. 15 illustrates a flow diagram of one embodiment for a computer-implemented method of using images captured by a camera to determine and monitor fluid characteristics for fluid being applied to a field by a nozzle of an implement.

FIG. 15 illustrates a flow diagram of one embodiment for a computer-implemented method of using images captured by a camera to determine and monitor fluid characteristics for fluid being applied to a field by an implement. The method 1500 is performed by processing logic that may comprise hardware (circuitry, dedicated logic, a processor, etc.), software (such as is run on a general purpose computer system or a dedicated machine or a device), or a combination of both. In one embodiment, the method 1500 is performed by processing logic (e.g., processing logic 126) of a processing system or of a monitor. The camera can be attached to a boom as described herein.

At operation 1502, the computer-implemented method captures, with at least one camera, a plurality of images of one or more spray patterns at a given pressure from a nozzle of an agricultural implement. When the nozzles are PWM (pulse width modulation) nozzles, the nozzles are intermittently on and off depending on whether spray is desired.

To account for the nozzle intermittently being off and not counting the nozzle as plugged, the processing logic assigns a rating to each of the plurality of images at operation 1504. In one example, each image is rated with a number (e.g., 1 for full stream, ½ for partial (or there could be more partial divisions such as ¼, ¾, etc.), and 0 for plugged) to generate data for the running average. At operation 1506, the processing logic determines a running average for a condition of the nozzle using the plurality of images (e.g., a sufficient number of captured images for a running average). This is referred to as a "windowed" function. The sufficient number of images is determined based on a time period of at least one cycle of the PWM nozzle. In one example, for a nozzle having a PWM frequency of 10 hertz, then the camera captures images at any frequency greater than 20 Hz for the running average in order to have greater than 20 frames/second over a time period of at least one PWM cycle to avoid aliasing. Images can be captured during multiple PWM cycles and used for the running average in order to increase a confidence in the running average data.

At operation 1508, the processing logic compares the running average of the condition of the nozzle to a predetermined fluid flow threshold indicator to indicate whether a nozzle has proper flow (e.g., no blockage, nearly no blockage), low flow (e.g., partial blockage), or no flow (e.g., full blockage). At operation 1510, if the running average of the condition of the nozzle is equal to or above the fluid flow threshold indicator, then the processing logic determines that the nozzle has proper flow (e.g., no blockage, nearly no blockage, at least 90% of full flow, etc.). At operation 1512, if the running average is below the threshold indicator, then the processing logic determines that the nozzle has low flow (e.g., partial blockage), or no flow (e.g., full blockage).

If the running average does not change over time, then no plugging may occur because opening and closing of the PWM nozzle does not result in determining that the valve is plugged. If the running average decreases over time, then the PWM nozzle is likely plugged. It is assumed that the open versus closed time for nozzles over time remains constant.

From the comparison of the running average to the fluid flow threshold indicator, the processing logic determines a condition of the nozzle in terms of plugged (0%), partially plugged (greater than 0 to less than threshold indicator), or proper flow.

The amount of plugging if any for each nozzle 50 can be displayed on a display (e.g., display device 125, display device 130, monitor 100, display 120, 130, or 1230 from WO2020/039295, any device with a display) at operation 1514. If the nozzle has low flow or no flow, then the display provides an alert to the user to warn the user of the low flow or no flow condition for the nozzle so the user can take corrective action for this blocked or partially blocked nozzle. The condition of the flow fluid for a nozzle can be a numerical amount, a color, or a combination of a color and numerical amount. For color, green can be used for no plugging, yellow for partial plugging, and red for totally plugged.

Although the operations in the computer-implemented methods disclosed herein are shown in a particular order, the order of the actions can be modified. Thus, the illustrated embodiments can be performed in a different order, and some operations may be performed in parallel. Some of the operations listed in the methods disclosed herein are optional in accordance with certain embodiments. In one example of FIG. 15, the operation 1514 is optional and may be removed from method 1500. The numbering of the operations presented is for the sake of clarity and is not intended to prescribe an order of operations in which the various operations must occur. Additionally, operations from the various flows may be utilized in a variety of combinations.

Figure 16:
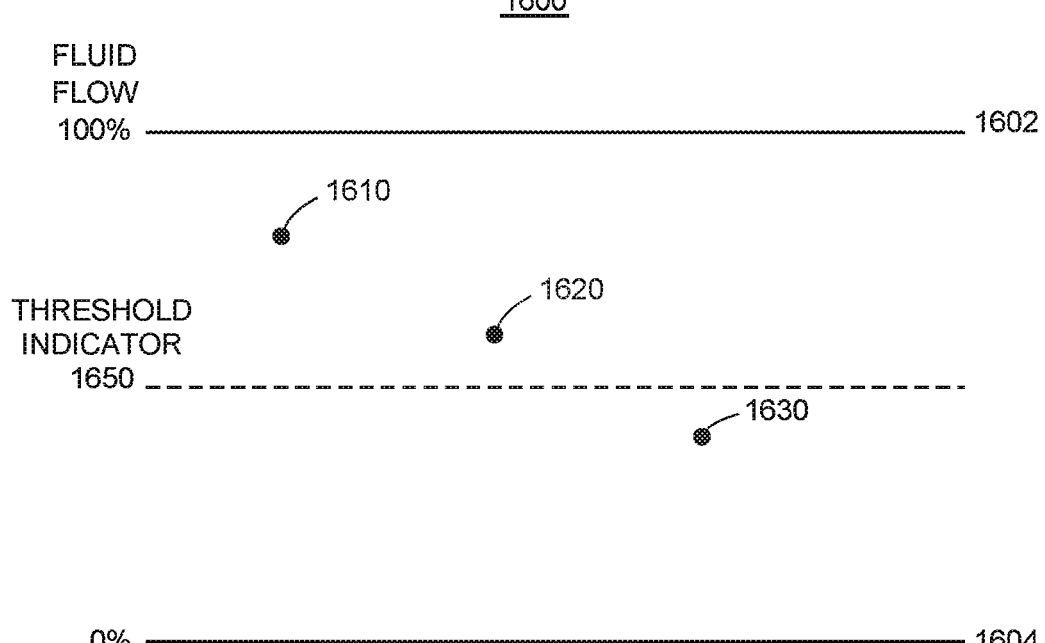
FIG. 16 illustrates a diagram 1600 to show a comparison of running average data of the condition of the nozzle to a predetermined fluid flow threshold indicator in accordance with one embodiment.

FIG. 16 illustrates a diagram 1600 to show a comparison of running average data of the condition of the nozzle to a predetermined fluid flow threshold indicator in accordance with one embodiment. The comparison of the running average data (e.g., running average data 1610, 1620, 1630) to the fluid flow threshold indicator 1650 indicates whether a nozzle has proper flow (e.g., no blockage, nearly no blockage), low flow (e.g., partial blockage), or no flow (e.g., full blockage). An upper line 1602 represents 100% flow and a lower line 1604 represents 0% flow. The running average data 1610 and 1620 are located below the upper line 1602 and above the threshold indicator 1650 to indicate that the nozzle during image capture for data 1610 and 1620 has proper flow. The running average data 1630 is located below the threshold indicator 1650 to indicate that the nozzle during image capture for data 1630 has low flow. For the low flow condition, a user receives an alert to provide a notification of the low flow and possible corrective action for the nozzle.

Cameras 70 can be connected to a monitor, such as the monitor disclosed in U.S. Pat. No. 8,078,367. Camera 70 and monitor can each process the images captured by camera 70 or share the processing of the images. In one embodiment, the images captured by camera 70 can be processed in camera 70 and the processed images can be sent to monitor. In another embodiment, the images can be sent to monitor for processing. Processed images can be used to identify flow, to identify blockage, or combinations thereof. Once identified, monitor can alert an operator of the condition and/or send a signal to a device to address the identified condition, such as a repair or cleaning of a plugged nozzle 50.

In any of the embodiments above with lights 60 or nozzle assembly 51, a light (60, 51) and camera (70) can capture images of a spray pattern of a nozzle (50, 51). The camera, a processing system, or a monitor can include a processor that is configured to determine when the nozzle (50, 51) is spraying and not spraying and calculate a difference in time between spraying and not spraying to determine a pulse width modulation of nozzle (50, 51). The determined pulse width modulation can then be used to signal lights 60 and cameras 70 when to be on to capture spraying from the nozzle (50, 51). This can be used with groups of nozzles (50, 51) when different groups are on versus off For example, if there are two groups, the cameras 70 associated with each group of nozzles (50, 51) can be operated to be on/off when the nozzles (50, 51) in that group are on/off.

Figure 17:
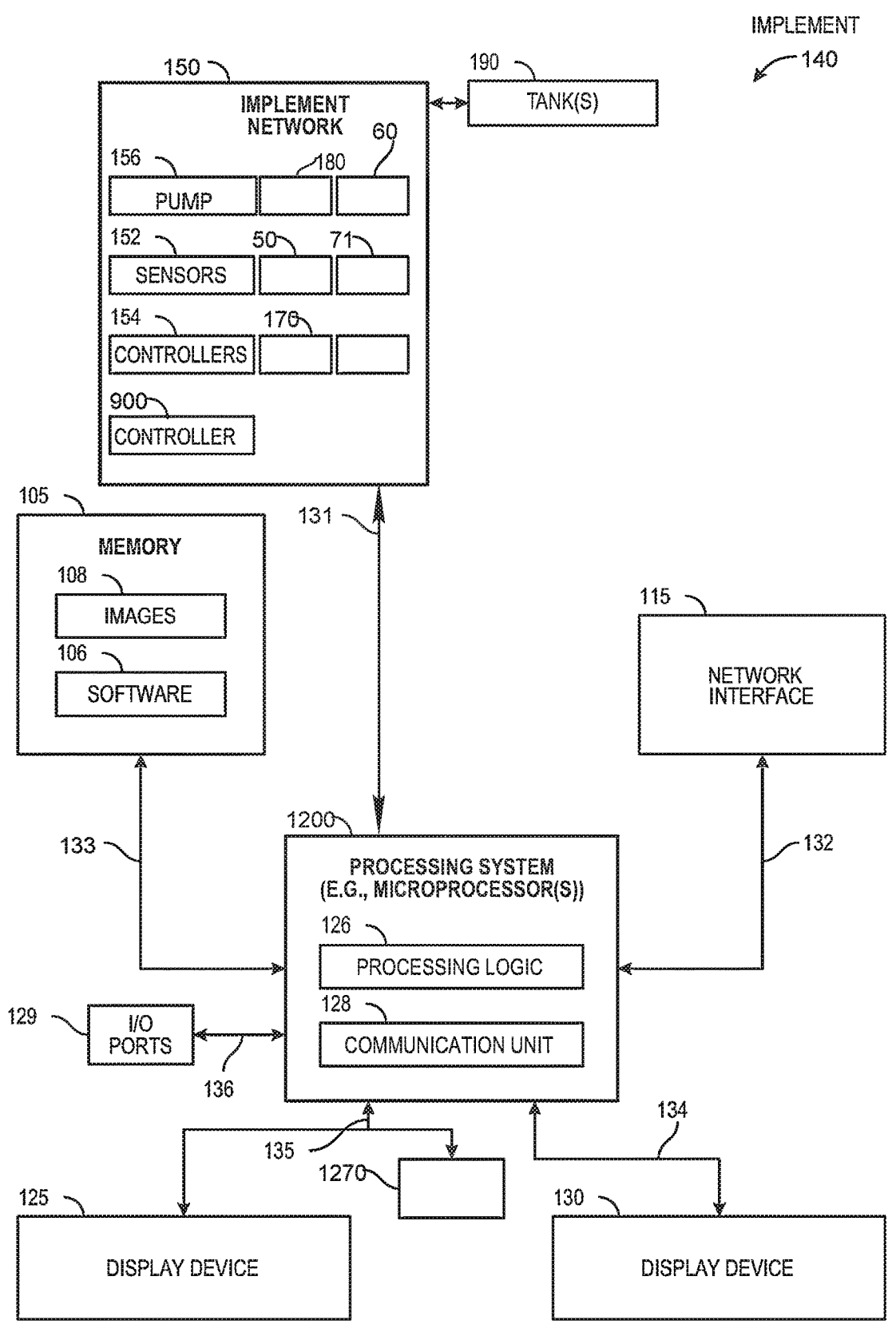
FIG. 17 shows an example of a block diagram of an implement 140 (e.g., sprayer, spreader, irrigation implement, etc.) in accordance with one embodiment.

FIG. 17 shows an example of a block diagram of an implement 140 (e.g., sprayer, spreader, irrigation implement, etc.) in accordance with one embodiment. The implement 140 includes a processing system 1200, memory 105, and a network interface 115 for communicating with other systems or devices. The network interface 115 can include at least one of a GPS transceiver, a WLAN transceiver (e.g., WiFi), an infrared transceiver, a Bluetooth transceiver, Ethernet, or other interfaces from communications with other devices and systems. The network interface 115 may be integrated with the implement network 150 or separate from the implement network 150 as illustrated in 16. The I/O ports 129 (e.g., diagnostic/on board diagnostic (OBD) port) enable communication with another data processing system or device (e.g., display devices, sensors, etc.).

In one example, the implement 140 is a self-propelled implement that performs operations for fluid applications of a field. Data associated with the fluid applications can be displayed on at least one of the display devices 125 and 130.

The processing system 1200 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the network interface 115 or implement network 150. The communication unit 128 may be integrated with the processing system or separate from the processing system.

Processing logic 126 including one or more processors may process the communications received from the communication unit 128 including agricultural data (e.g., planting data, GPS data, fluid application data, flow rates, etc.). The system 1200 includes memory 105 for storing data and programs for execution (software 106) by the processing system. The memory 105 can store, for example, software components such as fluid application software for analysis of fluid applications for performing operations of the present disclosure, or any other software application or module, images (e.g., captured images of crops, images of a spray pattern for rows of crops), alerts, maps, etc. The memory 105 can be any known form of a machine readable non-transitory storage medium, such as semiconductor memory (e g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1200 communicates bi-directionally with memory 105, implement network 150, network interface 115, display device 130, display device 125, and I/O ports 129 via communication links 131-136, respectively.

Display devices 125 and 130 can provide visual user interfaces for a user or operator. The display devices may include display controllers. In one embodiment, the display device 125 is a portable tablet device or computing device with a touchscreen that displays data (e.g., nozzle condition data, planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 125 may be a display (e.g., display provided by an original equipment manufacturer (OEM)) that displays images and data for a localized view map layer, as-applied liquid or fluid application data, as-planted or as-harvested data, yield data, controlling an implement (e.g., planter, tractor, combine, sprayer, etc.), steering the implement, and monitoring the implement (e.g., planter, combine, sprayer, etc.). A cab control module 1270 may include an additional control module for enabling or disabling certain components or devices of the implement.

The implement 140 (e.g., planter, cultivator, plough, sprayer, spreader, irrigation, implement, etc.) includes an implement network 150 having multiple networks. The implement network 150 having multiple networks (e.g., Ethernet network, Power over Ethernet (PoE) network, a controller area network (CAN) serial bus protocol network, an ISOBUS network, etc.) may include a pump 156 for pumping liquid or fluid from a storage tank(s) 190 to row units of the implement, communication module 180 for receiving communications from controllers and sensors and transmitting these communications. In one example, the implement network 150 includes nozzles 50, lights 60, and vision guidance system 71 having cameras and processors for various embodiments of this present disclosure.

Sensors 152 (e.g., speed sensors, seed sensors for detecting passage of seed, downforce sensors, actuator valves, OEM sensors, flow sensors, etc.), controllers 154 (e.g., drive system, GPS receiver), and the processing system 120 control and monitoring operations of the implement.

The OEM sensors may be moisture sensors or flow sensors, speed sensors for the implement, fluid application sensors for a sprayer, or vacuum, lift, lower sensors for an implement. For example, the controllers may include processors in communication with a plurality of sensors. The processors are configured to process data (e.g., fluid application data) and transmit processed data to the processing system 120. The controllers and sensors may be used for monitoring motors and drives on the implement.

Figure 18:
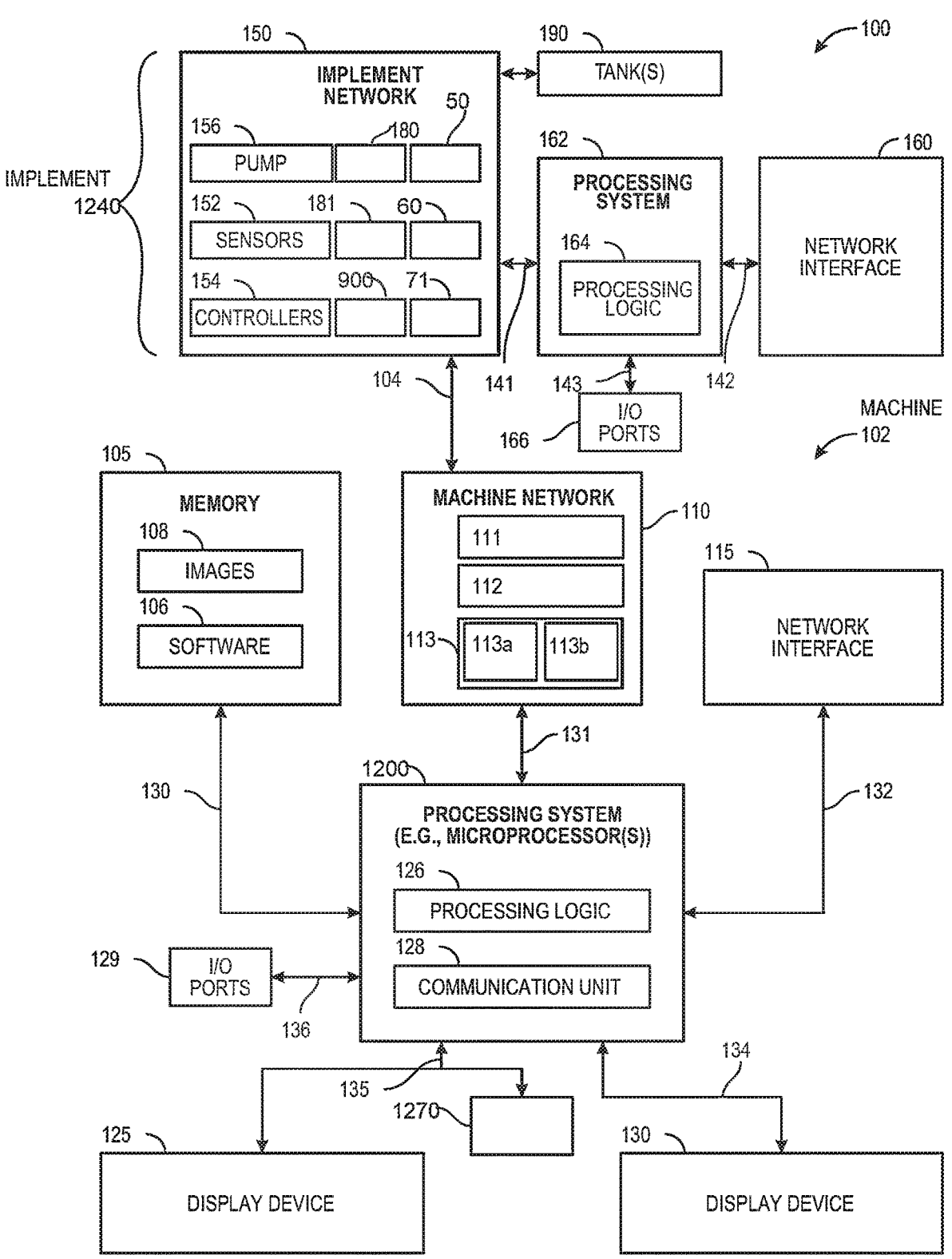
FIG. 18 shows an example of a block diagram of a system 100 that includes a machine 102 (e.g., tractor, combine harvester, etc.) and an implement 1240 (e.g., planter, cultivator, plough, sprayer, spreader, irrigation implement, etc.) in accordance with one embodiment.

FIG. 18 shows an example of a block diagram of a system 100 that includes a machine 102 (e.g., tractor, combine harvester, etc.) and an implement 1240 (e.g., planter, cultivator, plough, sprayer, spreader, irrigation implement, etc.) in accordance with one embodiment. The machine 102 includes a processing system 1200, memory 105, machine network 110 that includes multiple networks (e.g., an Ethernet network, a network with a switched power line coupled with a communications channel (e.g., Power over Ethernet (PoE) network), a controller area network (CAN) serial bus protocol network, an ISOBUS network, etc.), and a network interface 115 for communicating with other systems or devices including the implement 1240. The machine network 110 includes sensors 112 (e.g., speed sensors), controllers 111 (e.g., GPS receiver, radar unit) for controlling and monitoring operations of the machine or implement. The network interface 115 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 115 may be integrated with the machine network 110 or separate from the machine network 110 as illustrated in FIG. 18. The I/O ports 129 (e.g., diagnostic/on board diagnostic (OBD) port) enable communication with another data processing system or device (e.g., display devices, sensors, etc.).

In one example, the machine is a self-propelled machine that performs operations of a tractor that is coupled to and tows an implement for planting or fluid applications of a field. Data associated with the planting or fluid applications can be displayed on at least one of the display devices 125 and 130.

The processing system 1200 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the machine via machine network 110 or network interface 115 or implement via implement network 150 or network interface 160. The communication unit 128 may be integrated with the processing system or separate from the processing system. In one embodiment, the communication unit 128 is in data communication with the machine network 110 and implement network 150 via a diagnostic/OBD port of the I/O ports 129 or via network devices 113a and 113b. A communication module 113 includes network devices 113a and 113b. The communication module 113 may be integrated with the communication unit 128 or a separate component.

Processing logic 126 including one or more processors may process the communications received from the communication unit 128 including agricultural data (e.g., planting data, GPS data, liquid application data, flow rates, etc.). The system 1200 includes memory 105 for storing data and programs for execution (software 106) by the processing system. The memory 105 can store, for example, software components such as planting application software for analysis of planting applications for performing operations of the present disclosure, or any other software application or module, images (e.g., captured images of crops), alerts, maps, etc. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1200 communicates bi-directionally with memory 105, machine network 110, network interface 115, display device 130, display device 125, and I/O ports 129 via communication links 130-136, respectively.

Display devices 125 and 130 can provide visual user interfaces for a user or operator. The display devices may include display controllers. In one embodiment, the display device 125 is a portable tablet device or computing device with a touchscreen that displays data (e.g., planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied liquid or fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation, implement, etc.) includes an implement network 150 having multiple networks, a processing system 162 having processing logic 164, a network interface 160, and optional input/output ports 166 for communicating with other systems or devices including the machine 102. The implement network 150 having multiple networks (e.g., Ethernet network, Power over Ethernet (PoE) network, a controller area network (CAN) serial bus protocol network, an ISOBUS network, etc.) may include a pump 156 for pumping liquid or fluid from a storage tank(s) 190 to row units of the implement, communication modules (e.g., 180, 181) for receiving communications from controllers and sensors and transmitting these communications to the machine network. In one example, the communication modules include first and second network devices with network ports. A first network device with a port (e.g., CAN port) of communication module (CM) 180 receives a communication with data from controllers and sensors, this communication is translated or converted from a first protocol into a second protocol for a second network device (e.g., network device with a switched power line coupled with a communications channel, Ethernet), and the second protocol with data is transmitted from a second network port (e.g., Ethernet port) of CM 180 to a second network port of a second network device 113*b* of the machine network 110. A first network device 113*a* having first network ports (e.g., 1-4 CAN ports) transmits and receives communications from first network ports of the implement. In one example, the implement network 150 includes nozzles 50, lights 60, vision guidance system 71 having cameras and processors, and autosteer controller 900 for various embodiments of this present disclosure. The autosteer controller 900 may also be part of the machine network 110 instead of being located on the implement network 150 or in addition to being located on the implement network 150.

Sensors 152 (e.g., speed sensors, seed sensors for detecting passage of seed, downforce sensors, actuator valves, OEM sensors, flow sensors, etc.), controllers 154 (e.g., drive system for seed meter, GPS receiver), and the processing system 162 control and monitoring operations of the implement.

The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process data (e.g., liquid application data, seed sensor data) and transmit processed data to the processing system 162 or 1200. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 160 can be a GPS transceiver, a WLAN transceiver (e.g., WiFi), an infrared transceiver, a Bluetooth transceiver, Ethernet, or other interfaces from communications with other devices and systems including the machine 102. The network interface 160 may be integrated with the implement network 150 or separate from the implement network 150 as illustrated in FIG. 18.

The processing system 162 communicates bi-directionally with the implement network 150, network interface 160, and I/O ports 166 via communication links 141-143, respectively. The implement communicates with the machine via wired and possibly also wireless bi-directional communications 104. The implement network 150 may communicate directly with the machine network 110 or via the network interfaces 115 and 160. The implement may also by physically coupled to the machine for agricultural operations (e.g., planting, harvesting, spraying, etc.). The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 1200 during execution thereof by the system 100, the memory and the processing system also constituting machine-accessible storage media. The software 1206 may further be transmitted or received over a network via the network interface 115.

The foregoing description is presented to enable one of ordinary skill in the art to make and use embodiments of the invention and is provided in the context of a patent application and its requirements. Various modifications to the preferred embodiment of the apparatus, and the general principles and features of the system and methods described herein will be readily apparent to those of skill in the art. Thus, the present disclosure is not to be limited to the embodiments of the apparatus, system and methods described above and illustrated in the drawing figures, but is to be accorded the widest scope consistent with the spirit and scope of the appended claims.

The invention claimed is:

1. A system comprising:
   a plurality of nozzles disposed along an implement;
   a camera disposed on the implement to capture a plurality of images of a spray from a nozzle of the plurality of nozzles over a time period; and
   a processor to assign a rating to the plurality of images to account for the nozzle intermittently being off and not counting the nozzle as plugged and to determine a running average for a condition of the nozzle using the assigned rating for the plurality of images.

2. The system of claim 1, wherein the nozzle is actuated with a pulse width modulation (PWM) actuator to open and close the nozzle.

3. The system of claim 2, wherein a number of images captured for the running average is determined based on a time period of at least one cycle of the PWM nozzle.

4. The system of claim 3, wherein the camera captures images at a frequency that is more than twice of a PWM frequency of the PWM nozzle to avoid aliasing.

5. The system of claim 1, wherein the processor to compare the running average of the condition of the nozzle to a predetermined fluid flow threshold indicator to indicate whether the nozzle has proper flow, low flow due to partial blockage, or no flow due to full blockage.

6. The system of claim 5, wherein the processor to determine that the nozzle has proper flow when the running average of the condition of the nozzle is equal to or greater than the fluid flow threshold indicator and determine that the nozzle has low flow when the running average is less than the threshold indicator.

7. The system of claim 1, wherein the processor to determine a frequency of a pulse width modulation (PWM) of the nozzle is 10 to 35 Hz.

8. A computer-implemented method, comprising:
  capturing, with a camera, a plurality of images of one or more spray patterns from a nozzle of an agricultural implement;
  assigning a rating to each captured image to account for the nozzle intermittently being off and not counting the nozzle as plugged; and
  determining a running average for a condition of the nozzle using the assigned rating for the plurality of images.

9. The computer-implemented method of claim 8, wherein the nozzle comprises a pulse width modulation (PWM) nozzle.

10. The computer-implemented method of claim 9, wherein a number of images captured for the running average is determined based on a time period of at least one cycle of the PWM nozzle.

11. The computer-implemented method of claim 10, wherein the camera captures images at a frequency that is more than twice of a PWM frequency of the PWM nozzle to avoid aliasing.

12. The computer-implemented method of claim 8, further comprising:
  comparing the running average of the condition of the nozzle to a predetermined fluid flow threshold indicator to indicate whether the nozzle has proper flow, low flow due to partial blockage, or no flow due to full blockage.

13. The computer-implemented method of claim 12, further comprising:
  determining that the nozzle has proper flow when the running average of the condition of the nozzle is equal to or greater than the fluid flow threshold indicator; and
  determining that the nozzle has low flow when the running average is less than the threshold indicator.

14. The computer-implemented method of claim 13, further comprising:
  displaying, with a display device, an amount of plugging if any for the nozzle.

15. The computer-implemented method of claim 14, wherein the plugging is displayed as a numerical amount, a color, or a combination of a color and numerical amount.

* * * * *